United States Patent [19]

Hayashi

[11] 4,448,517

[45] May 15, 1984

[54] DRIVE CONTROLLING MECHANISM OF OPTICAL MEMBER FOR USE IN COPYING APPARATUS

[75] Inventor: Masamichi Hayashi, Aichi, Japan

[73] Assignee: Minolta Camera Kabushiki Kaisha, Osaka, Japan

[21] Appl. No.: 396,474

[22] Filed: Jul. 8, 1982

[30] Foreign Application Priority Data

Jul. 11, 1981 [JP] Japan .................................. 56-108436
Jan. 20, 1982 [JP] Japan ...................................... 57-7869

[51] Int. Cl.³ .......................... G03B 27/34; G02B 7/11
[52] U.S. Cl. ........................................ 355/56; 350/255
[58] Field of Search ................... 355/8, 11, 51, 56, 57, 355/55, 58, 59, 65, 66; 254/415; 350/255

[56] References Cited

U.S. PATENT DOCUMENTS 4,211,482 7/1980 Arai et al. .......................... 355/60 X
4,219,273 8/1980 Ikeda .................................... 350/255

Primary Examiner—L. T. Hix
Assistant Examiner—D. S. Lee
Attorney, Agent, or Firm—Wenderoth, Lind & Ponack

[57] ABSTRACT

A drive controlling mechanism of optical members for use in a copying apparatus, including an optical member, a pair of pulleys, a drive pulley for driving the pulleys for the rotation, a wire wound around the pulleys and the drive pulley and secured to the optical member, a pair of urging members for urging the pulleys in opposite directions for preventing the optical member from being brought out of contact with the stopper member, a plurality of stopper members for stopping the optical member at predetermined positions, a pair of detecting members for detecting swing movement of the pulleys, and a control circuit.

11 Claims, 11 Drawing Figures

DRIVE CONTROLLING MECHANISM OF OPTICAL MEMBER FOR USE IN COPYING APPARATUS

BACKGROUND OF THE INVENTION

The present invention generally relates to a copying apparatus in which optical members such as a lens unit, a mirror, etc. are supported to be movable reciprocatingly along a linear path, and more particularly, to a drive controlling mechanism of the optical members, by which one optical member is driven so as to be brought to a halt at a plurality of predetermined positions.

Conventionally, in copying apparatuses having a plurality of copying magnifications, it has been so arranged that changeover of the magnifications is effected by the following three methods; a method (1) in which not only the lens unit but also the mirror are changed in position so as to change the conjugate distance, a method (2) in which the lens unit is changed in position and is provided with an auxiliary lens for changing the magnification with the conjugate distance being maintained constant, and a method (3) in which a zoom lens is employed or the lens unit itself is replaced.

In the method (3), the zoom lens or a plurality of lens units for corresponding magnifications are required to be provided, thus resulting in increase of production cost. Meanwhile, in the methods (1) and (2), either the lens unit and the mirror or the lens unit only is required to be moved to a plurality of positions corresponding to respective magnifications.

In conventional drive controlling mechanisms of optical members such as a lens unit, a mirror, etc., it has been generally so arranged that, when one optical member moved by a motor comes into contact with the stopper members provided at predetermined positions corresponding to respective magnifications, power supply to the motor is shut off through switch members to be actuated by the optical members, as disclosed in U.S. Pat. No. 4,219,273.

However, such prior art drive controlling mechanisms have such an inconvenience that a plurality of stopper members and switch members equal, in number, to the stop positions of the optical member are required to be provided and to be adjusted to each other so that the switch members may be actuated so as to shut off power supply to the motor exactly when the optical member has been brought to a halt through contact of the optical member by the stopper members.

Meanwhile, it is to be noted that the copying magnification is required to be changed variously in accordance with practice of each country or at users' request even in the case of a copying apparatus of the same model. For example, the reduction ratio of 0.64 is generally adopted in the U.S.A., but the reduction ratio of 0.7 or 0.8 is generally employed in Japan or European countries. The above described conventional drive controlling mechanisms are disadvantageous in that all the stopper members and the switch members are required to be adjusted to each other in accordance with such changes of the magnification. Namely, prior art drive controlling mechanisms have such disadvantages that a plurality of stopper members and switch members equal, in number, to copying magnifications are required to be provided and further, assembly and adjustment thereof are extremely complicated.

SUMMARY OF THE INVENTION

Accordingly, an essential object of the present invention is to provide an improved drive controlling mechanism of optical members for use in a copying apparatus, in which a single stop control arrangement and only two detecting members for detecting stop positions of the optical member are required to be provided regardless of change in number of copying magnifications and further, assembly and adjustment thereof are remarkably simplified, with substantial elimination of disadvantages inherent in conventional drive controlling mechanisms of this kind.

Another important object of the present invention is to provide an improved drive controlling mechanism of the above described type which is simple in structure, highly reliable in actual use, suitable for mass production at low cost, and can be readily incorporated into copying apparatuses and the like at low cost.

Still another object of the present invention is to provide an improved drive controlling mechanism of the above described type in which even if a bouncing phenomenon that either one of detecting members for detecting pivotal movement of pulleys is caused to repeat ON and OFF states alternately by, elastic force of urging members for urging the pulleys in opposite directions takes place after the optical member has been brought to a halt at a predetermined position, a drive pulley for driving the optical member is positively prevented from being driven by a motor so that the optical member may be held at a stop.

In accomplishing these and other objects according to one preferred embodiment of the present invention, there is provided an improved drive controlling mechanism of optical members for use in a copying apparatus, comprising:

an optical member which is supported to be movable reciprocatingly along a linear path;

a pair of a first and a second pulleys which are swingably provided at opposite ends in the direction of reciprocating movement of said optical member and on a plane in parallel with said linear path of movement of said optical member;

a drive pulley for driving said first and second pulleys for rotation thereof, which is provided between said first and said second pulleys and is arranged to be rotatable in a normal direction and the reverse direction;

a wire which is wound around said pair of said first and said second pulleys and said drive pulley and is secured to said optical member;

a plurality of stopper members for stopping said optical member at predetermined positions, which are provided in the course of said linear path of movement of said optical member;

a pair of a first and a second urging members for urging said first and said second pulleys, respectively in opposite directions for preventing said optical member from being brought out of contact with said stopper member;

a pair of a first and a second detecting members for detecting swing movement of said first and said second pulleys, respectively;

said first and said second pulleys being selectively swung through contact of said optical member by one of said stopper members; and a control means including an electrical circuitry, which is arranged to stop rotational drive of said drive pulley through selective detection of swing movement of respective said first and said second pulleys by said first and said second detecting members.

In accordance with the present invention, the optical member is stopped at predetermined positions by a plurality of stopper members provided in the course of the path of reciprocating movement of the optical member, either one of the pulleys disposed at opposite ends in the direction of reciprocating movement of the optical member is caused to pivot in response to the stop of the optical member and then, the swing movement is detected so as to prevent the drive pulley from being driven, whereby only a single stop control arrangement for the optical member is required to be provided regardless of change in number of copying magnifications and detection of stop positions of the optical member can be effected by only two detecting members for detecting swing movement of a pair of pulleys and further, adjustment of the stop positions of the optical member can be made with much ease through independent adjustment of the stopper members and the detecting members for detecting swing movement of the pulleys.

Namely, in accordance with the present invention, the drive controlling mechanism is reduced in number of the components, and assembly and adjustments thereof are made remarkably simple, thus resulting in substantial reduction of cost.

Furthermore, in accordance with the present invention, even if the bouncing phenomenon that either one of the detecting members for detecting swing movement of the pulleys is caused to alternately repeat ON and OFF states by elastic force of urging members for urging the pulleys in opposite directions takes place after the optical member has been brought to a halt at a predetermined position, the drive pulley for driving the optical member is positively prevented from being driven for rotation thereof so that the optical member may be held at a stop.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
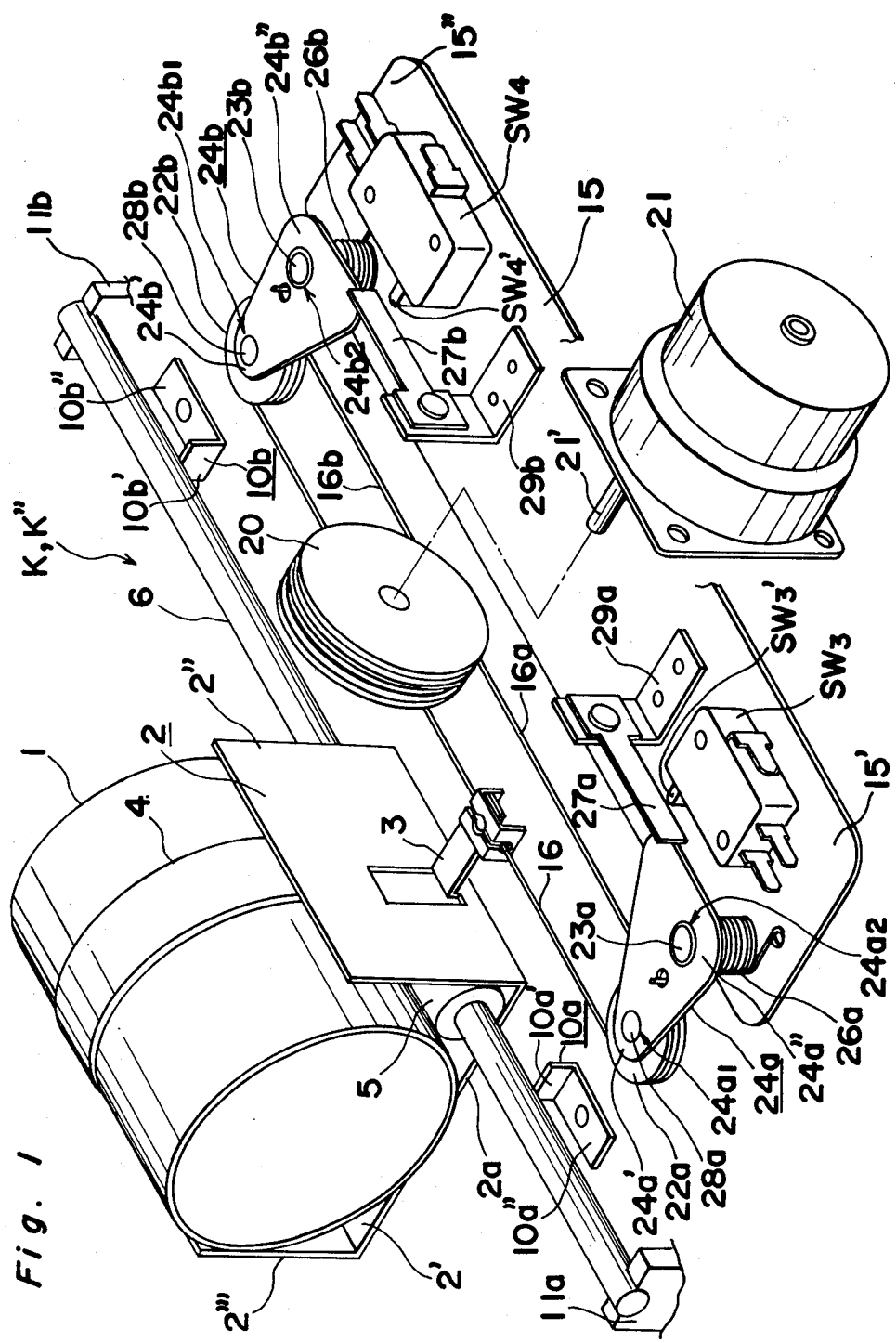
FIG. 1. is a perspective view of a drive controlling mechanism according to a first, a third, and a fourth embodiments of the present invention.

Referring now to the drawings, there is shown in FIGS. 1 to 6, a drive controlling mechanism K according to a first embodiment of the present invention, which controls drive of optical members for use in a copying apparatus having two copying magnification modes; a life size copying mode and a reduced size copying mode. The drive controlling mechanism K includes a lens unit 1, a carriage 2, a sliding bearing 5, a guide shaft 6, a pair of a stopper member 10a for the life size copying mode and a stopper member 10b for the reduced size copying mode, a base plate 15 of a rectangular shape, a wire 16, a pair of pulleys 22a and 22b, a pair of levers 24a and 24b, a drive pulley 20 and a reversible drive motor 21. The carriage 2 of a U-shaped cross section has opposite side edges 2a and 2b and a straight portion 2' and bent portions 2'' and 2''' provided at opposite ends of the straight portion 2', respectively. The pair of L-shaped stopper members 10a for the life size copying mode and 10b for the reduced size copying mode have bent portions 10a' and 10b' and straight portions 10a'' and 10b'', respectively. The pair of plate-like levers 24a and 24b are substantially formed into a triangular shape and have three vertex portions 24a', 24a'' and 24a''' and three vertex portions 24b', 24b'' and 24b''', respectively. The lever 24a has a first hole 24a1, a second hole 24a2 and a projection 25a which are formed at the vertex portions 24a', 24a'' and 24a''', respectively. Likewise, the lever 24b has a first hole 24b1, a second hole 24b2 and a projection 25b which are formed at the vertex portions 24b', 24b'' and 24b''', respectively.

The rectangular base plate 15 having opposite ends 15' and 15'' is attached to a frame F (not shown) of the copying apparatus. The guide shaft 6 is supported at opposite ends thereof by bearing stands 11a and 11b, respectively which are secured to the frame F in parallel with and side by side with the base plate 15. The reversible drive motor 21 is mounted approximately at a central portion of the base plate 15 with an output shaft 21' of the drive motor 21 extending in parallel with the base plate 15. The drive pulley 20 is secured to the output shaft 21'. The pair of levers 24a and 24b are, through the second holes 24a2 and 24b2, pivotally mounted, respectively, on support shafts 23a and 23b which are fixed to the base plate 15 and are disposed adjacent to the opposite ends 15' and 15'', respectively. A pair of L-shaped brackets 29a and 29b are attached to the base plate 15 between the drive motor 21 and the lever 24a, and between the drive motor 21 and the lever 24b, respectively. The pair of pulleys 22a and 22b are rotatably supported, respectively, by shafts 28a and 28b fitted into the first holes 24a1 and 24b1 so as to be rotated about the shafts 28a and 28b extending at right angles to the base plate 15. The vertex portions 24a' and 24a'' of the lever 24a are disposed more adjacent to the end 15' of the base plate 15 than the vertex portion 24a''' having the projection 25a and likewise, the vertex portions 24b' and 24b'' of the lever 24b are disposed more adjacent to the end 15'' of the base plate 15 than the vertex portion 24b''' having the projection 25b. A pair of microswitches SW3 and SW4 are attached to the base plate 15 and are disposed adjacent to the projection 25a of the lever 24a and the projection 25b of the lever 24b, respectively. A pair of leaf springs 27a and 27b are mounted on the L-shaped brackets 29a and 29b, respectively so as to extend between a contact SW3' of the microswitch SW3 and the projection 25a and between a contact SW4' of the microswitch SW4 and the projection 25b, respectively. It is to be noted that the pair of leaf springs 27a and 27b are deflectable into engagement with the contacts SW3' and SW4', respectively upon contact of the leaf springs 27a and 27b by the projections 25a and 25b due to swing movement of the levers 24a and 24b. The wire 16 is wound around the pair of pulleys 22a and 22b and the drive pulley 20.

The lens unit 1 is fixedly embraced by a band 4 secured to the carriage 2 and is supported by the guide shaft 6 through the sliding bearing 5 secured to the carriage 2 so as to be movable reciprocatingly along a linear path with the guide shaft 6 being disposed adjacent to the bent portion 2'' of the carriage 2. A bracket 3 is mounted, at one end thereof, on the bent portion 2'' of the carriage 2 and is attached, at the other end, to the wire 16. Meanwhile, as best shown in FIGS. 2 and 3, a guide roller 7 is rotatably secured to the bent portion 2''' of the carriage 2 and is disposed at a lower portion of the bent portion 2''' so as to be rolled on a guide rail 8 fixed to the frame F in parallel with the guide shaft 6.

The pair of the stopper member 10a for the life size copying mode and the stopper member 10b for the reduced size copying mode are attached to the frame F in the course of the linear path of movement of the lens unit 1 so as to be disposed at positions corresponding to the life size copying mode and the reduced size copying mode, respectively so that opposite side edges 2a and 2b of the carriage 2 may be selectively brought into contact with the bent portion 10a' of the stopper member 10a and the bent portion 10b' of the stopper member 10b, respectively, whereby the lens unit 1 is selectively brought to a halt at positions corresponding to the life size copying mode and the reduced size copying mode.

Figure 2:
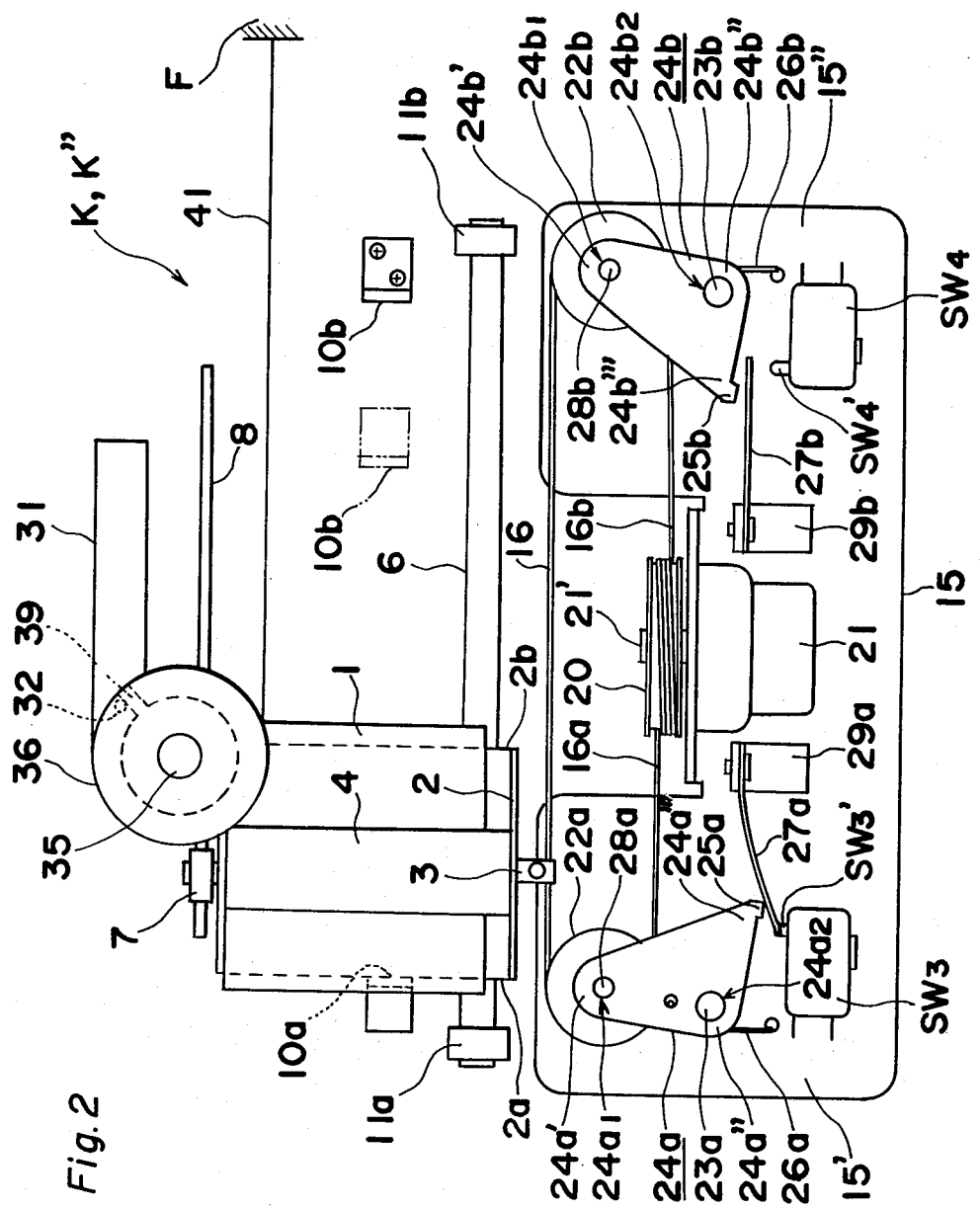
FIG. 2 is a top plan view of the drive controlling mechanism of FIG. 1 at the time of a life size copying mode.
Figure 3:
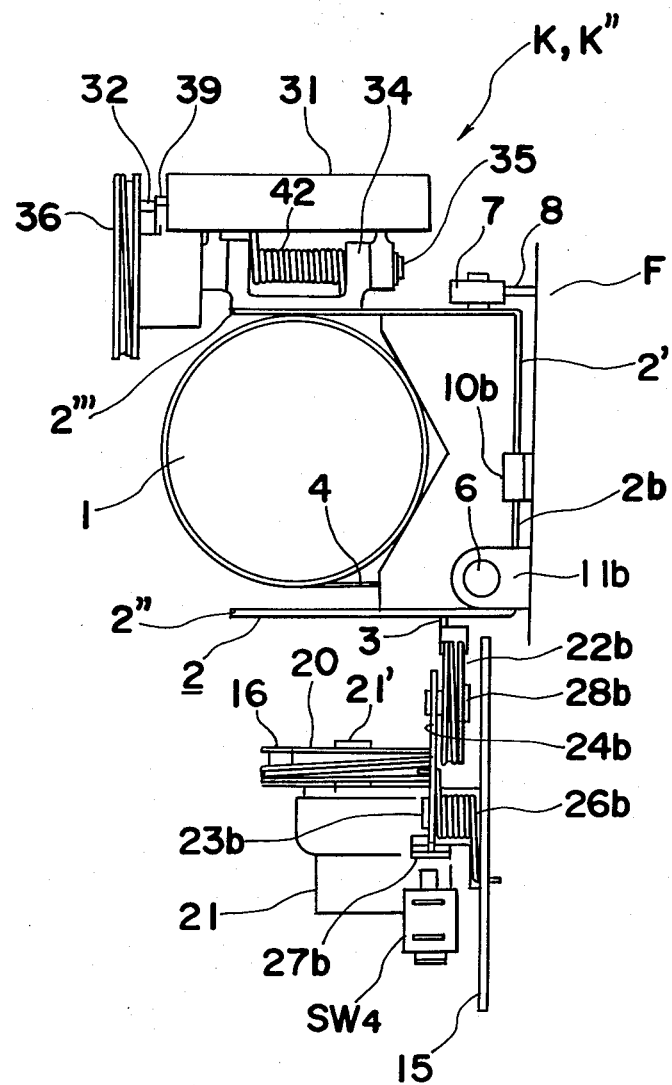
FIG. 3 is a right side elevational view of FIG. 2.

Furthermore, a pair of tension springs 26a and 26b are wound around the support shafts 23a and 23b, respectively so as to elastically urge the levers 24a and 24b in the counterclockwise and clockwise directions in FIG. 2 so that the wire 16 may not be slackened.

Figure 4:
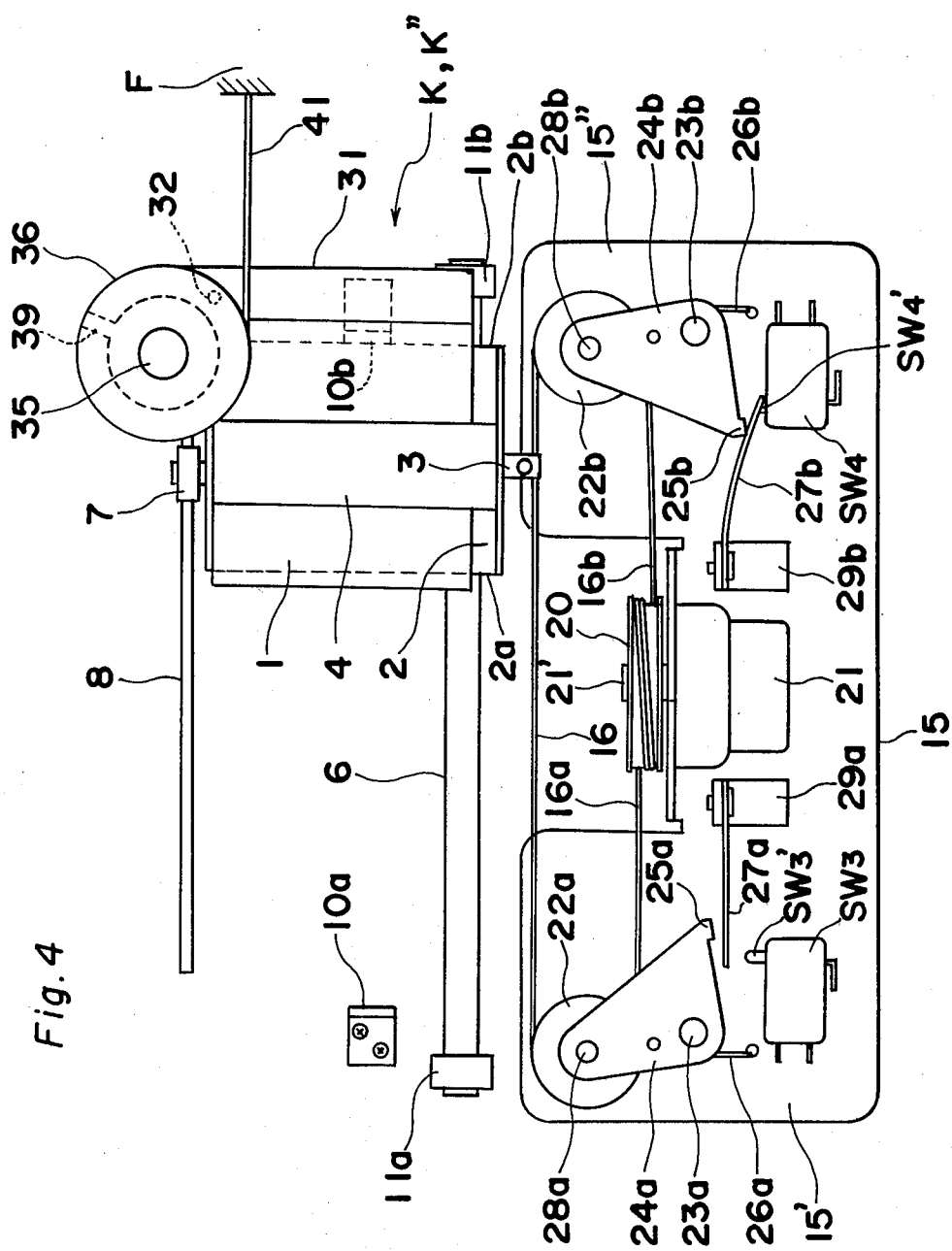
FIG. 4 is a view similar to FIG. 2, showing the drive control mechahism of FIG. 1 at the time of a reduced size copying mode.
Figure 5:
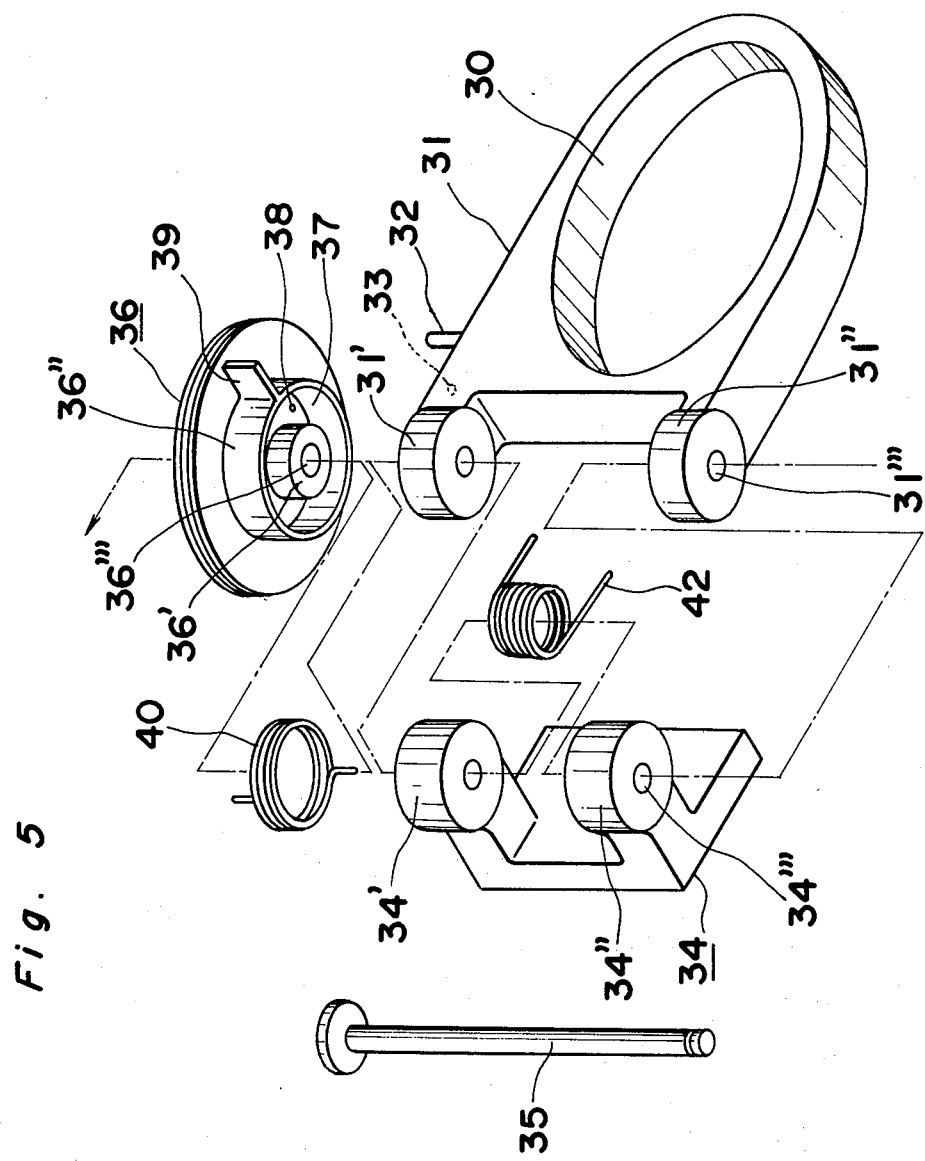
FIG. 5 is an exploded view of an arrangement for an auxiliary lens employed in the drive controlling mechanism of FIG. 1.

Moreover, as shown in FIGS. 2 to 5, the lens unit 1 is provided with an auxiliary lens 30 held by a lens frame 31. It is so arranged that the auxiliary lens 30 is retracted from the optical path during the life size copying mode as shown in FIG. 2 and is projected into the optical path during the reduced size copying mode as shown in FIG. 4. An arrangement for the auxiliary lens 30 includes a carriage 34, a shaft 35, a pulley 36, a spring 40 and a spring 42 as best shown in FIG. 5. The carriage 34 has a pair of an upper bearing portion 34' and a lower bearing portion 34'' which are juxtaposed and are formed with a through-hole 34'''. The lens frame 31 has a pair of an upper bearing portion 31' and a lower bearing portion 31'' which are juxtaposed and are formed with a through-hole 31'''. The pulley 36 has a cylindrical boss 36' formed at a central portion thereof, an annular portion 36'' formed outside and concentrically with the boss 36'', and a through-hole 36''' formed concentrically with the boss 36'. Thus, the pulley 36 has an annular groove 37 formed between the boss 36' and the annular portion 36''. The pulley 36, further, has an opening 38 formed at a position between the boss 36' and the annular portion 36'' which is provided with a rectangular protrusion 39.

The carriage 34 is secured to the bent portion 2''' of the carriage 2 and is disposed at an upper portion of the bent portion 2''' and adjacent to the side edge 2b. The spring 42 is provided between the pair of juxtaposed upper and lower bearing portions 34' and 34'' of the carriage 34. The lens frame 31 is pivotally mounted on the carriage 34 so that the pair of juxtaposed upper and lower bearing portions 34' and 34'' of the carriage 34 may be pivotally fitted between the pair of juxtaposed upper and lower bearing portions 31' and 31'' of the lens frame 31 with the through-hole 31''' of the lens frame 31 being aligned with the through-hole 34''' of the carriage 34. The spring 40 is inserted into the annular groove 37 of the pulley 36 so that one end and the other end of the spring 40 may be, respectively, fitted into the opening 38 of the pulley 36 and an opening 33 formed at one portion of the upper face of the lens frame 31 adjacent to the upper bearing portion 31' with the through-hole 36'''' of the pulley 36 being aligned with the through-hole 31''' of the lens frame 31. The shaft 35 is provided so as to be sequentially and downwardly fitted into the through-hole 36''', one portion of the through-hole 31''' formed on the upper bearing portion 31', the through-hole 34''', the spring 42 and the other portion of the through-hole 31''' formed on the lower bearing portion 31''. The lens frame 31 is, further, provided with a pin driven into at one portion thereof adjacent to the opening 33. It is to be noted that the pulley 36 is urged in the clockwise direction in FIG. 2 by the spring 40 and the lens frame 31 is urged by the spring 42 wound around the shaft 35, in the clockwise direction in FIG. 2, namely in the direction in which the auxiliary lens 30 is projected into the optical path, with the urging force of spring 42 being regulated upon engagement of the protrusion 39 of the pulley 36 by the pin 32 of the lens frame 31. Furthermore, as shown in FIGS. 2 to 4, a wire 41 is provided so as to be wound around the pulley 36 in the counterclockwise direction in FIG. 2 so that one end and the other end of the wire 41 may be, respectively, secured to the pulley 36 and the frame F, etc.

In the above-described arrangement for the auxiliary lens 30, when the lens unit 1 has been moved to the position corresponding to the life size copying mode as shown in FIG. 2, the wire 41 is rewound from the pulley 36, so that the pulley 36 is rotated in the counterclockwise direction in FIG. 2 against the urging force of the spring 40 and thus, the pin 32 is urged in the counterclockwise direction in FIG. 2 by the protrusion 39, whereby the lens frame 31 accommodating the auxiliary lens 30 therein is pivoted about the shaft 35 in the counterclockwise direction in FIG. 2 so as to be retracted from the optical path.

On the other hand, when the lens unit 1 has been moved to the position corresponding to the reduced size copying mode as shown in FIG. 4, the pulley 36 is rotated in the clockwise direction in FIG. 4 by the urging force of the spring 40 so as to wind a slack portion of the wire 41 around the pulley 36 and the protrusion 39 is disengaged from the pin 32, so that the lens frame 31 accommodating the auxiliary lens 30 therein is pivoted about the shaft 35 in the clockwise direction in FIG. 4 by the urging force of the spring 42 so as to be projected into the optical path.

In the above-described arrangements of the drive controlling mechanism K, when the drive motor 21 is rotated in the normal direction, the drive pulley 20 is rotated in the counterclockwise direction in FIG. 1 and thus, the wire 16 is moved in the counterclockwise direction in FIG. 1 so that the pair of pulleys 22a and 22b may be rotated in the counterclockwise direction in FIG. 1. In synchronization with movement of the wire 16 in the counterclockwise direction in FIG. 1, the lens unit 1 which is slidably supported at opposite ends thereof by the guide shaft 6 and the guide rail 8 is moved in the leftward direction in FIG. 2.

On the other hand, when the drive motor 21 is rotated in the reverse direction, the lens unit 1 is moved in the rightward direction in FIG. 2 in a manner contrary to the foregoing description.

As described earlier, the microswitches SW3 and SW4 are provided for detecting swing movement of the levers 24a and 24b, respectively. Namely, it is so arranged that, when the lens unit 1 has been brought to a halt at the position corresponding to the life size copying mode upon contact of the side edge 2a of the carriage 2 by the stopper member 10a for the life size copying mode in response to rotation of the drive motor 21 in the normal direction as shown in FIG. 2, one portion 16a of the wire 16 disposed between the pulley 22a and the drive pulley 20 is pulled in the rightward direction in FIG. 2 so as to be wound around the drive pulley 20, so that the lever 24a is swung about the support shaft 23a in the clockwise direction in FIG. 2 together with the pulley 22a and thus, the leaf spring 27a is deflected by the projection 25a towards the contact SW3' of the microswitch SW3, whereby the microswitch SW3 is turned on. By the ON signal of the microswitch SW3, power supply to the drive motor 21 is shut off.

On the contrary, when the lens unit 1 has been brought to a halt at the position corresponding to the reduced size copying mode upon contact of the side edge 2b of the carriage 2 by the stopper member 10b for the reduced size copying mode in response to rotation of the drive motor 21 in the reverse direction as shown in FIG. 4, one portion 16b of the wire 16 disposed between the pulley 22b and the drive motor 21 is pulled in the leftward direction in FIG. 4 so as to be wound around the drive pulley 20, so that the lever 24b is swung about the support shaft 23b in the counterclockwise direction in FIG. 4 together with the pulley 22b and thus, the leaf spring 27b is deflected by the projection 25b towards the contact SW4' of the microswitch SW4, whereby the microswitch SW4 is turned on. By the ON signal of the microswitch SW4, power supply to the drive motor 21 is shut off.

Meanwhile, even if the lens unit 1 is disposed at either one of the positions corresponding to the life size copying mode and the reduced size copying mode, the levers 24a and 24b are, respectively, urged in the counterclockwise direction and the clockwise direction in FIG. 2 together with the pulleys 22a and 22b by the tension springs 26a and 26b and the leaf springs 27a and 27b, whereby the lens unit 1 is desirably prevented from being selectively brought out of contact with the stopper members 10a and 10b.

Figure 6:
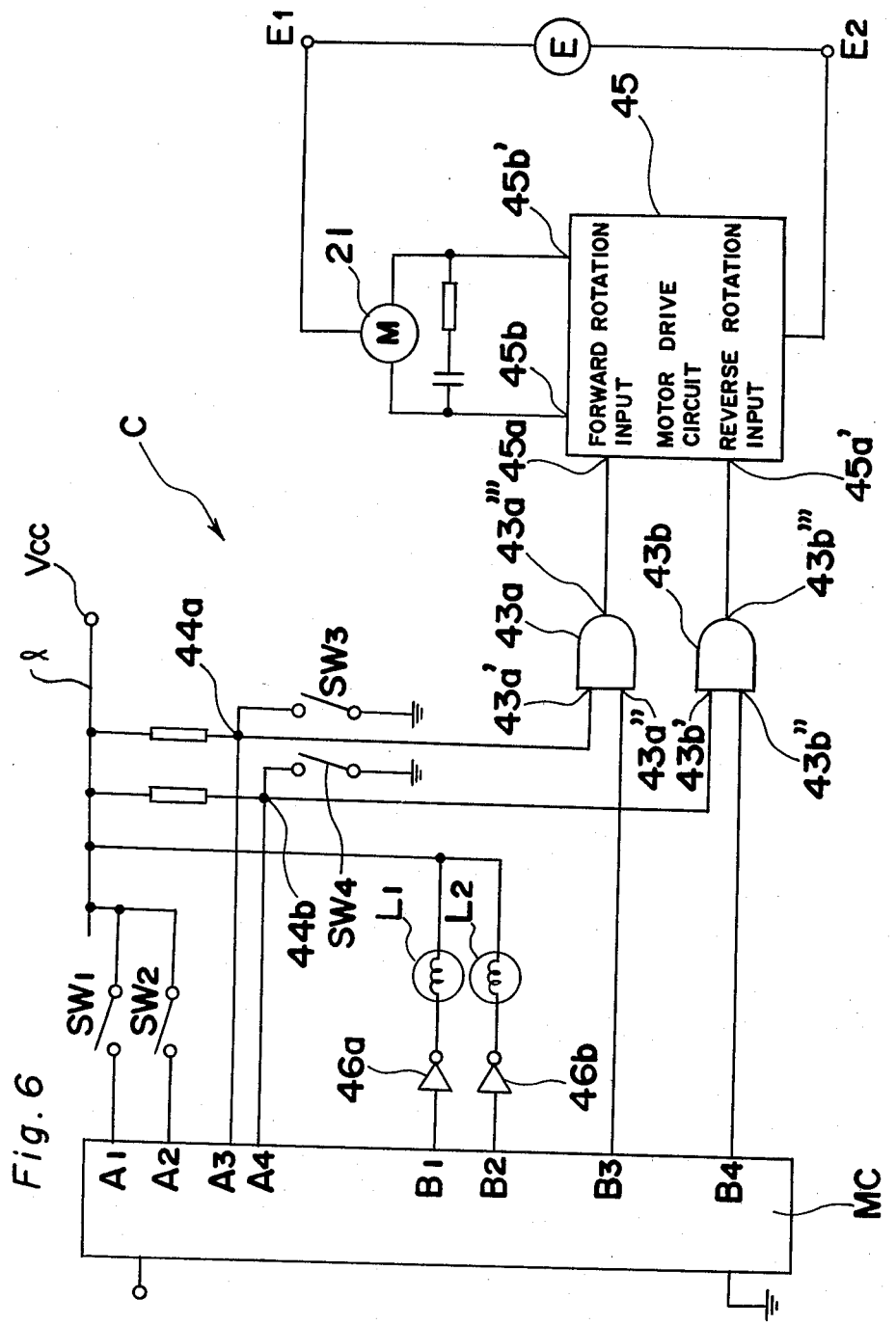
FIG. 6 is a control circuit diagram for the drive control mechanism of FIG. 1, according to the first embodiment of the present invention.

Hereinbelow, a control circuit C for the drive controlling mechanism K will be described with reference to FIG. 6.

The control circuit C includes a controlling voltage Vcc microcomputer MC, a switch SW1 for selecting the life size copying mode, a switch SW2 for selecting the reduced size copying mode, AND circuits 43a and 43b, a motor drive circuit 45, inverters 46a and 46b, and lamps L1 for displaying the life size copying mode and L2 for displaying the reduced size copying mode. The microcomputer MC includes input ports A1, A2, A3 and A4, and output ports B1, B2, B3 and B4. The AND circuit 43a has input terminals 43a' and 43a" and an output terminal 43a'''. Likewise, the AND circuit 43b has input terminals 43b' and 43b" and an output terminal 43b'''. The motor drive circuit 45 includes input terminals 45a for rotating the drive motor 21 in the normal direction and 45a' for rotating the drive motor 21 in the reverse direction and output terminals 45b and 45b'. The motor is driven in the normal and reverse directions by a power source E connected between terminals E1 and E2 under the controlling by the motor drive circuit 45. The switches SW1 and SW2 which are connected to a line l leading to the controlling voltage Vcc are, respectively, connected to the input ports A1 and A2. The microswitch SW3 connected to ground is connected to the input port A3 and also to the input terminal 43a' of the AND circuit 43a through a contact 44a leading to the line l. The microswitch SW4 connected to ground is connected to the input port A4 and also to the input terminal 43b' of the AND circuit 43b through a contact 44b leading to the line l. The output terminal B1 is connected to the line l via the inverter 46a and the lamp L1. The output terminal B2 is connected to the line l via the inverter 46b and the lamp L2. The output port B3 is connected to the input terminal 43a" of the AND circuit 43a whose output terminal 43a''' is connected to the input terminal 45a' of the motor drive circuit 45. The output port B4 is connected to the input terminal 43b" of the AND circuit 43b whose output terminal 43b''' is connected to the input terminal 45a' of the motor drive circuit 45. The output terminals 45b and 45b' of the motor drive circuit 45 are connected to the drive motor 21. When high level signals from the AND circuits 43a and 43b are applied to the input terminals 45a and 45a', respectively, the drive motor 21 is arranged to be rotated in the normal and reverse directions, respectively.

In the above-described arrangements of the control circuit C for the drive controlling mechanism K, when the switches SW1 and SW2 are selectively turned on, a high level signal from the controlling voltage Vcc, appearing on the line l, is selectively transmitted to the input ports A1 and A2 and thus, signals for selecting the life size copying mode and the reduced size copying mode are, respectively, supplied from the output ports B3 and B4 to the input terminal 43a" of the AND circuit 43a and the input terminal 43b" of the AND circuit 43b. The lamps L1 and L2 are arranged to be turned on for indicating that the lens unit 1 is disposed at the positions corresponding to the life size copying mode and the reduced size copying mode, respectively.

Namely, it is so arranged that the switch SW1 for selecting the life size copying mode is normally maintained in the ON state and that the signal for selecting the life size copying mode is supplied from the output port B3 to the input terminal 43a" of the AND circuit 43a when a main switch is turned on. In the case where the lens unit 1 has been moved to the position corresponding to the life size copying mode with the lens unit 1 being positioned by the stopper member 10a as shown in FIG. 2 when the main switch is turned on, the microswitch SW3 is in the ON state, so that a low level signal is supplied from the microswitch SW3 to the input terminal 43a' of the AND circuit 43a and thus, the AND circuit 43a is not actuated, whereby the drive motor 21 is kept at a stop.

Meanwhile, in the case where the lens unit 1 is at a stop at a position except for the position corresponding to the life size copying mode when the main switch is turned on, the microswitch SW3 is turned off, so that the high level signal is supplied from the power source E to the input terminal 43a' with the signal for selecting the life size copying mode being supplied from the output port B3 to the input terminal 43a" and thus, the AND circuit 43a is actuated so as to transmit an output signal from the output terminal 43a'" of the AND circuit 43a to the input terminal 45a of the motor drive circuit 45, whereby the drive motor 21 is rotated in the normal direction. In response to rotation of the drive motor 21 in the normal direction, the lens unit 1 is moved so as to be brought to a halt at the position corresponding to the life size copying mode, so that the microswitch SW3 is turned on upon swing movement of the lever 24a and thus, the low level signal is transmitted from the microswitch SW3 to the input terminal 43a', whereby actuation of the AND circuit 43a is stopped. Accordingly, supply of the output signal from the output terminal 43a'" to the input terminal 45a is stopped, so that power supply from the AND circuit 43a to the drive motor 21 is shut off and thus, the copying apparatus can be used for the life size copying.

On the other hand, when the switch SW2 for selecting the reduced size copying mode is turned on, the signal for selecting the reduced size copying mode is supplied from the output port B4 to the input port 43b" of the AND circuit 43b while the high level signal is supplied from the power source E to the input terminal 43b' of the AND circuit 43b upon turning off of the microswitch SW4, so that the AND circuit 43b is actuated so as to transmit on output signal from the output terminal 43b'" of the AND circuit 43b to the input terminal 45a' of the motor drive circuit 45, whereby the drive motor 21 is rotated in the reverse direction. In response to rotation of the drive motor 21 in the reverse direction, the lens unit 1 is moved so as to be brought to a halt at the position corresponding to the reduced size copying mode with the lens unit 1 being positioned by the stopper member 10b, so that the microswitch SW4 is turned on upon swing movement of the lever 24b and thus, a low level signal is transmitted from the microswitch SW4 to the input terminal 43b", whereby actuation of the AND circuit 43b is stopped. Thus, supply of the output signal from the output terminal 43b'" to the input terminal 45a' is stopped, so that power supply to the drive motor 21 is shut off and thus, the copying apparatus can be used for the reduced size copying.

Meanwhile, in the present invention, the copying reduction ratio can be easily changed to another value only by displacing the stopper member 10b to a desired position corresponding to the new copying reduction ratio, for example, to the position shown in two-dot chain lines in FIG. 2 without the need for modifying the drive pulley 20, pulleys 22a and 22b, control circuit C, etc.

Referring now to FIGS. 7 to 10, there is shown a drive controlling mechanism K' according to a second embodiment of the present invention, which controls drive of optical members for use in a copying apparatus having three copying magnification modes; a life size copying mode, a first reduced size copying mode and a second reduced size copying mode. Since mechanical arrangements of the drive controlling mechanism K' are similar to those of the drive controlling mechanism K, detailed description thereof is abbreviated for brevity and only arrangements different from those of the drive controlling mechanism K will be described hereinbelow.

The drive controlling mechanism K' includes a stopper member 50 for the life size copying mode, a stopper member 51 for the second reduced size copying mode, a stopper means 52 for the first reduced size copying mode, bearing stands 53a and 53b, a support shaft 55 rotatably mounted on the bearing stands 53a and 53b.

The stopper members 50 for the life size copying mode and 51 for the second reduced size copying mode are, respectively, provided in the course of the linear path of movement of the lens unit 1 so as to be brought into contact with opposite side edges 2a and 2b of the carriage 2. The stopper means 52 for the first reduced size copying mode is provided between the stopper members 50 and 51 and includes a pair of elongated stopper members 57a and 57b pivotally mounted on the support shaft 55. The stopper members 57a and 57b are, respectively, urged in the counterclockwise and clockwise directions in FIG. 7 by springs 58. The urging force of the spring 58 is regulated through selective contact of the opposite side edges 2a and 2b of the carriage 2 by positioning portions 59a and 59b formed on the frame F of the copying apparatus. A spring 60 is wound around one end of the support shaft 55 adjacent to and outside the bearing stand 53a. The bearing stand 53a is further formed with an elongated groove 54 so that a pin 56 driven into the support shaft 55 may be pivotally moved within the groove 54 in response to rotation of the support shaft 55. It is to be noted that the support shaft 55 is urged in the clockwise direction in FIGS. 8 and 9 by the spring 60 and the urging force of the spring 60 is regulated through contact of the pin 56 by one end of the groove 54. When the pin 56 has been brought into contact with the one end of the groove 54 as described above, the stopper members 57a and 57b are projected into the linear path of movement of the carriage 2 so as to be brought into contact with the opposite side edges 2a and 2b of the carriage 2, respectively.

Figure 8:
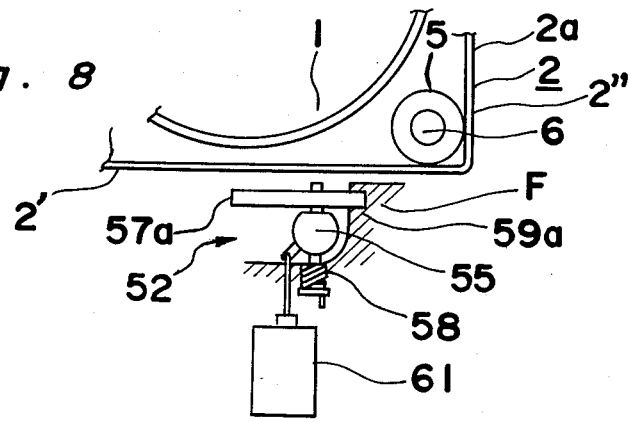
FIG. 8 is a partial left side elevational view of FIG. 7.
Figure 9:
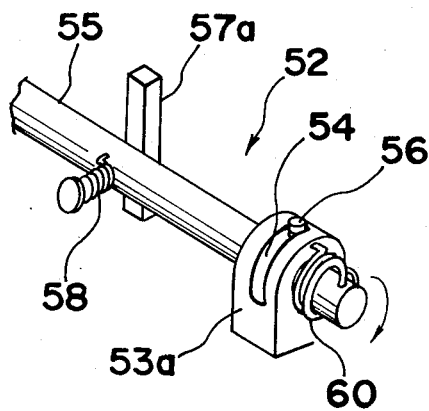
FIG. 9 is a partial perspective view of the drive controlling mechanism of FIG. 7.

Meanwhile, since the support shaft 55 is connected with a plunger of a solenoid 61, the support shaft 55 is pivoted in the counterclockwise direction in FIG. 8 upon turning on of the solenoid 61 against the urging force of the spring 60 in the clockwise direction in FIG. 8 so that the stopper members 57a and 57b may take a horizontal position with respect to the straight portion 2' of the carriage 2 as shown in FIG. 8 and thus, one end of the stopper member 57a and one end of the stopper member 57b are retracted from the linear path of movement of the carriage 2 so as not to be brought into contact with the opposite side edges 2a and 2b of the carriage 2, respectively. It should be noted that the other end of the stopper member 57a and the other end of the stopper member 57b are at all times held in contact with the positioning portions 59a and 59b, respectively.

Figure 10:
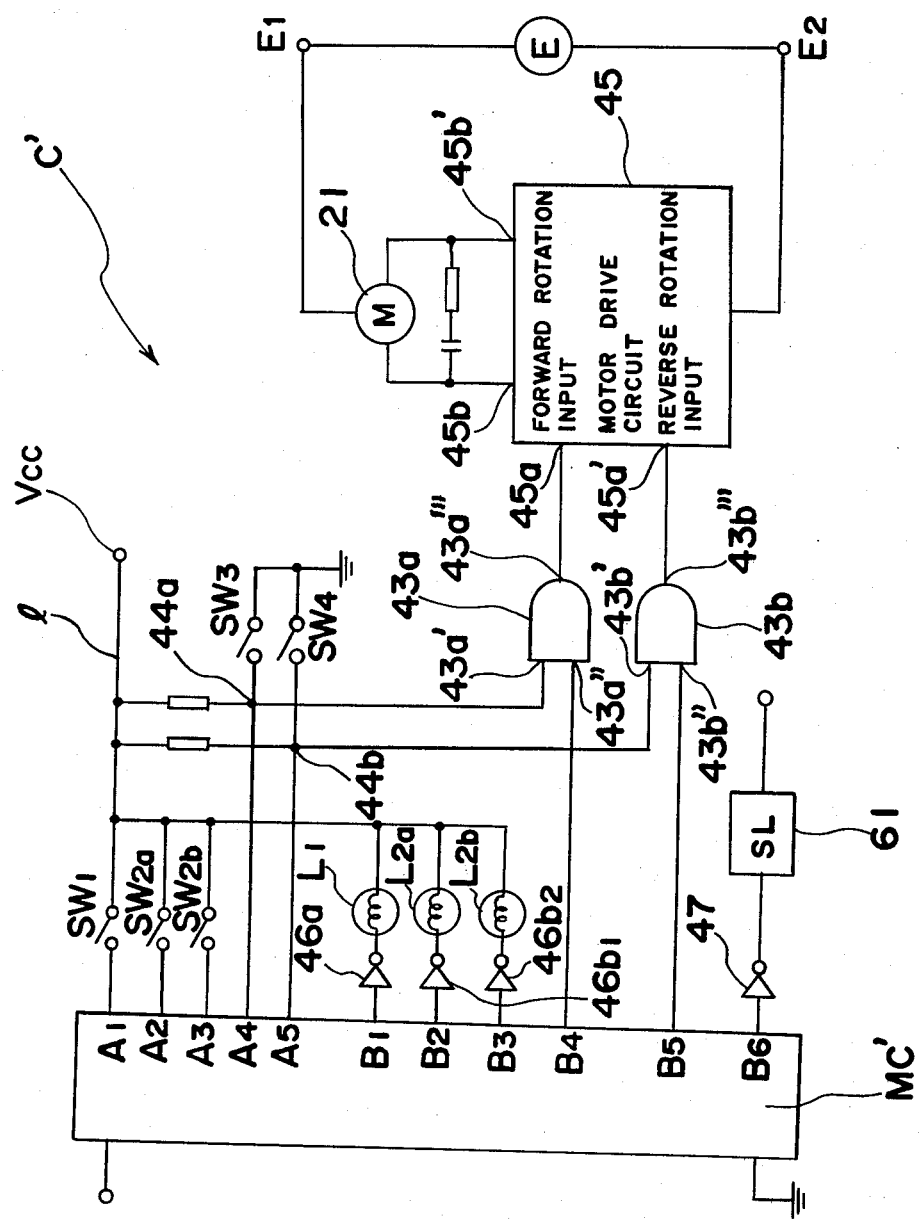
FIG. 10 is a control circuit diagram for the drive control mechanism of FIG. 7.

Referring to FIG. 10, there is shown a control circuit C' for the drive controlling mechanism K'. Since the control circuit C' is fundamentally equal to the control circuit C in the arrangements, detailed description thereof is abbreviated for brevity. The control circuit C' includes a microcomputer MC', a switch SW2a for selecting the first reduced size copying mode, a switch SW2b for selecting the second reduced size copying mode, a lamp L2a for displaying the first reduced size copying mode, a lamp L2b for displaying the second reduced size copying mode, and inverters 46b1, 46b2 and 47. In comparison with the microcomputer MC, the microcomputer MC' further includes an input port A5, output ports B5 and B6. The output port B6 is connected, through the inverter 47, to the solenoid 61. The microswitch SW3 connected to ground is connected to the input port A4 and also to the input terminal 43a' of the AND circuit 43a through the contact 44a leading to the line l. The microswitch SW4 connected to ground is connected to the the input port A5 and also to the input terminal 43b' through hte contact 44b leading to the line l. Signals from the switch SW2a for selecting the first reduced size copying mode are supplied from the output ports B4 and B5 to the input terminal 43a" of the AND circuit 43a and the input terminal 43b" of the AND circuit 43b, respectively. Signals from the switch SW2b for selecting the second reduced size copying mode are supplied from the output port B5 to the input terminal 43b" of the AND circuit 43b.

Figure 7:
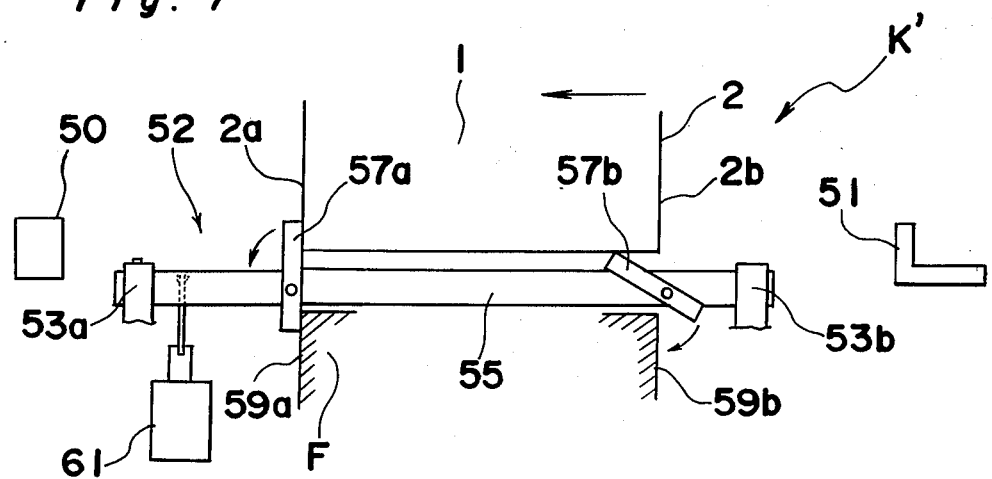
FIG. 7 is a front elevational view of a drive controlling mechanism according to a second embodiment of the present invention.

In the above described arrangements of the control circuit C' for the drive controlling mechanism K', when the copying apparatus has been set to the life size copying mode, the lens unit 1 is moved in the leftward direction in FIG. 7 so as to be positioned by the stopper member 50 and thus, the microswitch SW3 is turned on. When the copying apparatus has been set to the second reduced size copying mode, the lens unit 1 is moved in the rightward direction in FIG. 7 so as to be positioned by the stopper member 51 and thus, the microswitch SW4 is turned on. Furthermore, in the case where the lens unit 1 is moved from the position corresponding to the life size copying mode to the position corresponding to the second reduced size copying mode or vice versa, the switch SW2a or the switch SW1 is turned on and at the same time, the solenoid 61 is turned on so as to retract the stopper members 57a and 57b from the linear path of movement of the carriage 2.

Meanwhile, in order to bring the lens unit 1 to a halt at the position corresponding to the first reduced size copying mode, the solenoid 61 is turned off, so that the support shaft 55 is pivoted in the clockwise direction in FIG. 8 and thus, one end of each of the stopper members 57a and 57b is projected into the linear path of movement of the carriage 2. When the lens unit 1 is moved in the leftward direction in FIG. 7 from the position corresponding to the second reduced size copying mode to the position corresponding to the first reduced size copying mode, the side edge 2a of the carriage 2 is firstly brought into contact with the stopper member 57b, so that the stopper member 57b is pivoted in the counterclockwise direction in FIG. 7 so as to be retacted from the linear path of movement of the carriage 2. When the lens unit 1 is further moved in the leftward direction in FIG. 7, the lens unit 1 is positioned through contact of the side edge 2a by the stopper member 57a and thus, the microswitch SW3 is turned on.

On the contrary, when the lens unit 1 is moved in the rightward direction in FIG. 7 from the position corresponding to the life size copying mode to the position corresponding to the first reduced size copying mode, the side edge 2b of the carriage 2 is firstly brought into contact with the stopper member 57a, so that the stopper member 57a is pivoted in the clockwise direction in FIG. 7 so as to be retracted from the linear path of movement of the carriage 2. When the lens unit 1 is further moved in the rightward direction in FIG. 7, the lens unit 1 is positioned through contact of the side edge 2b by the stopper member 57b and thus, the microswitch SW4 is turned on.

Meanwhile, when the lens unit 1 is moved from the position corresponding to the first reduced size copying mode to the position corresponding to the life size copying mode or to the position corresponding to the second reduced size copying mode, the switch SW1 for selecting the life size copying mode or the switch SW2b for selecting the second reduced size copying mode is turned on and at the same time, the solenoid 61 is turned on so as to retract the stopper members 57a and 57b from the linear path of movement of the carriage 2 and then, the drive motor 21 is rotated in the normal direction or the reverse direction. However, since the stopper members 57a and 57b are selectively subjected to the urging force of the leaf springs 27a and 27b, respectively, the stopper members 57a and 57b are selectively brought into pressure contact with opposite side edges 2a and 2b of the carriage 2, so that it is quite difficult to retract the stopper members 57a and 57b from the linear path of movement of the carriage 2 by electromagnetic force of the solenoid 61. Accordingly, in order to move the lens unit 1, for example, to the position corresponding to the life size copying mode, it is so arranged that the drive motor 21 is rotated in the reverse direction until the microswitch SW3 is turned off and then, the solenoid 61 is turned on so as to retract the stopper members 57a and 57b from the linear path of movement of the carriage 2 and at the same time the drive motor 21 is rotated in the normal direction.

However, in the drive controlling mechanisms K and K' according to the first and second embodiments of the present invention, respectively, it is necessary to position the pulleys accurately relative to corresponding microswitches for detecting swing movement of the pulleys or set to an optimum value precisely the elastic force of the springs for urging the pulleys in opposite directions. In the case where the above described positioning of the pulleys or setting of the elastic force of the springs has been conducted inaccurately, a so-called bounding phenomenon that either one of the microswitches is turned off by the elastic force of the springs and then, is turned on upon drive of the drive motor so as to alternately repeat ON and OFF states takes place undesirably so that there is a possibility that the drive motor is undesirably driven by ON signals in a pulse mode due to the bounding phenomenon after the optical member has been stopped at a desired position.

In order to eliminate the above described disadvantage of the drive controlling mechanisms K and K', drive controlling mechanisms K" and K'" according to a third and a forth embodiments of the present invention, respectively will be described with reference to FIGS. 1 to 5 and FIG. 11, hereinbelow.

Since mechanical arrangements of the drive controlling mechanisms K" and K'" are equal to those of the drive controlling mechanism K, detailed description thereof is abbreviated for brevity. It should be noted that in FIG. 11, a control circuit C" for the drive controlling mechanism K" is shown in solid lines and a control circuit C'" for the drive controlling mechanism K''' further includes portions shown in broken lines in addition to the arrangements of the control circuit C''.

In accomplishing the above described objects, the drive controlling mechanism K'' of optical members for use in a copying apparatus comprises:

an optical member which is supported to be movable reciprocatingly along a linear path;

a pair of a first and a second pulleys which are swingably provided at opposite ends in the direction of reciprocating movement of said optical member and on a plane in parallel with said linear path of movement of said optical member;

a drive pulley for driving said first and said second pulleys for rotation thereof, which is provided between said first and said second pulleys and is arranged to be rotatable in a normal direction and the reverse direction;

a wire which is wound around said pair of said first and said second pulleys and said drive pulley and is secured to said optical member;

a plurality of stopper members for stopping said optical member at predetermined positions, which are provided in the course of said linear path of movement of said optical member;

a pair of a first and a second urging means for urging said first and said second pulleys, respectively in opposite directions for preventing said optical member from being brought out of contact with said stopper member;

a pair of a first and a second detecting members for detecting swing movement of said first and said second pulleys, respectively;

said first and said second pulleys being selectively swung through contact of said optical member by one of said stopper members;

a selective signal generating means which generates a selective signal for selecting one of the predetermined positions of said optical member; and a control means including an electrical circuitry, which is arranged to drive said drive pulley for rotation thereof so as to move said optical member to the one of the predetermined positions selected by said selective signal of said selective signal generating means, to stop rotational drive of said drive pulley through selective detection of swing movement of respective said first and said second pulleys by said first and said second detecting members, and to prevent said drive pulley from being driven for rotation thereof until a next selective signal is generated.

Figure 11:
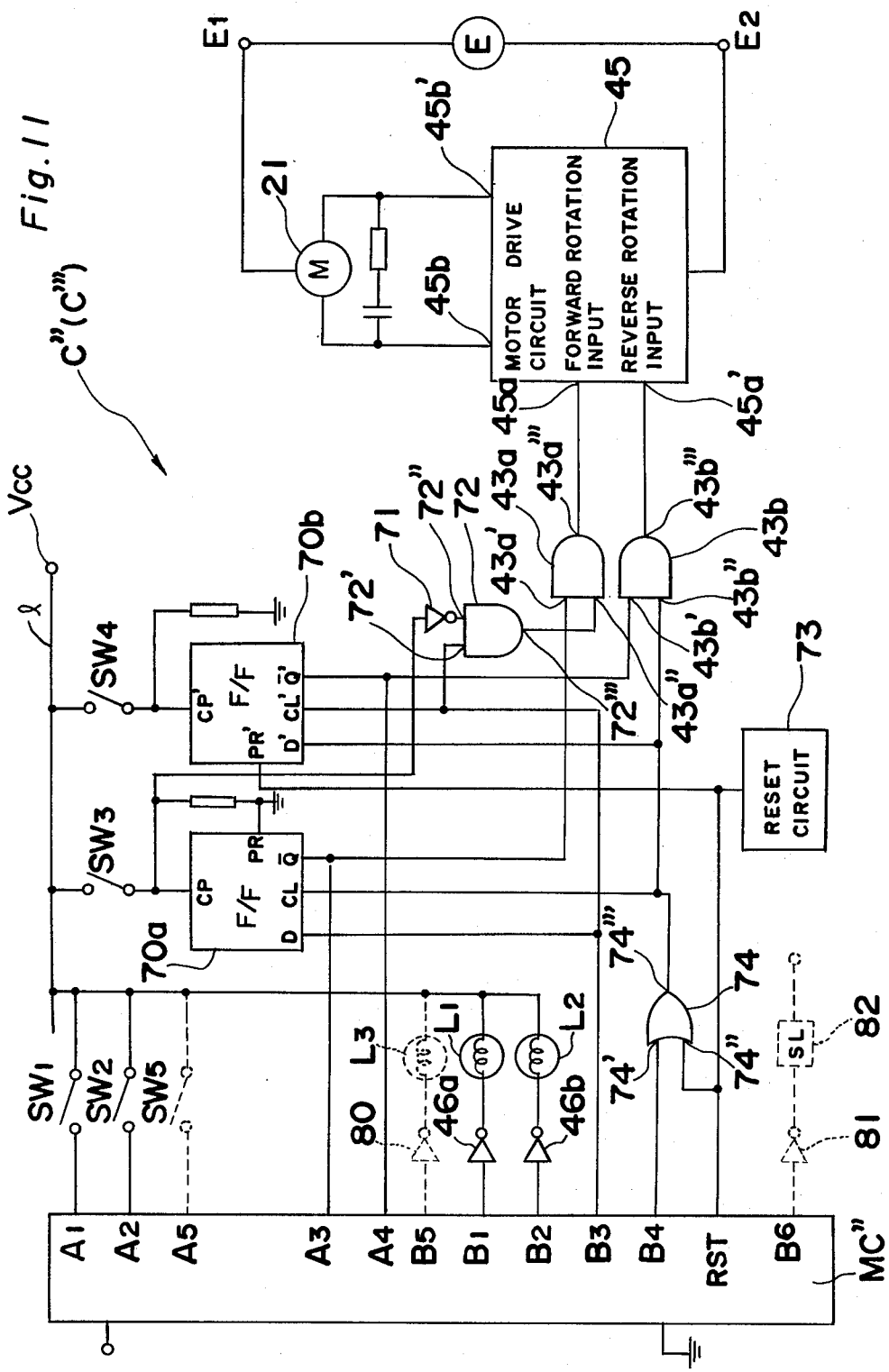
FIG. 11 is a control circuit diagram for the drive control mechanism of FIG. 1, according to the third and fourth embodiments of the present invention.

Referring to FIG. 11, there is shown the control circuit C'' for the drive controlling mechanism K'' of optical members for use in a copying apparatus having two copying magnification modes; a life size copying mode and a reduced size copying mode. Since the control circuit C'' is similar to the control circuit C, detailed description thereof is abbreviated for brevity. The control circuit C'' includes a microcomputer MC'', D type flip-flops 70a and 70b, an inverter 71, an AND circuit 48b, a reset circuit 73 and an OR circuit 74. The microcomputer MC'' includes input ports A1, A2, A3, A4 and RST and output ports B1, B2, B3 and B4. The flip-flop 70a includes input terminals CL, CP, D and PR and an output terminal $\overline{Q}$. Likewise, the flip-flop 70b includes input terminals CL', CP', D' and PR' and an output terminal $\overline{Q}'$. The AND circuit 72 includes input terminals 72' and 72'' and an output terminal 72''' while the OR circuit 74 includes input terminals 74' and 74'' and an output terminal 74'''.

It should be noted here that the control circuit C'' employs the D type flip-flops 70a and 70b so as to constitute a self-hold circuit. The control logic of the flip-flop 70a is arranged as follows. When a high level input signal is applied to the input terminal PR, an output signal having the same level as that of an input signal applied to the input terminal CL is supplied from the output terminal $\overline{Q}$. When a low level and a high level input signals are applied to the input terminals PR and CL, respectively, a high level output signal is supplied from the output terminal $\overline{Q}$. Furthermore, when low level input signals are applied to the input terminals PR and CL, respectively, an output signal having a level obtained through inversion of a level of an input signal applied to the input terminal D is supplied from the output terminal $\overline{Q}$ during rise of an input signal applied to the input terminal CP and the above described state is sustained until rise of a next input signal applied to the input terminal CP.

Since the control logic of the flip-flop 70b is arranged in the same manner as described above, detailed description thereof is abbreviated for brevity.

Meanwhile, the output port B3 is connected to the input terminal D of the flip-flop 70a, the input terminal CL' of the flip-flop 70b and the input terminal 72' of the AND circuit 72 whose output terminal 72''' leads to the input terminal 43a'' of the AND circuit 43a. The output port B4 is connected to the input terminal 74' of the OR circuit 74 whose output terminal 74''' leads to the input terminal CL of the flip-flop 70a, the input terminal D' of the flip-flop 70b and the input terminal 43b'' of the AND circuit 43b. The reset circuit 73 is connected to the input port RST, the input terminal 74'' of the OR circuit 74 and the input terminal PR' of the flip-flop 70b. The microswitch SW3 is connected to the input terminals CP and PR of the flip-flop 70a and the input terminal 72'' of the AND circuit 72 through the inverter 71. The microswitch SW4 is connected to the input terminal CP' of the flip-flop 70b. The output $\overline{Q}$ of the flip-flop 70a is connected to the input port A3 and the input terminal 43a' of the AND circuit 43a. The output terminal $\overline{Q}'$ of the flip-flop 70b is connected to the input port A4 and the input terminal 43b' of the AND circuit 43b.

When the reset circuit 73 is set upon turning on of the power source, a high level output signal supplied therefrom for approximately 100 msec. and thereafter, the reset circuit 73 is held in the reset state so as to supply a low level output signal therefrom. When the high level output signal from the reset circuit 73 is applied to the input port RST, low level output signals are supplied from the output ports B3 and B4, respectively. Meanwhile, when the low level output signal from the reset circuit 73 is applied to the input port RST upon resetting of the reset circuit 73, a high level and a low level output signals are supplied from the output ports B3 and B4, respectively. Meanwhile, when the switch SW1 for selecting the life size copying mode is turned on with the reset circuit 73 being held in the reset state, a high level and a low level output signals are supplied from the output ports B3 and B4, respectively. Likewise, when the switch SW2 for selecting the reduced size copying mode is turned on with the reset circuit 73 being held in the reset state, a low level and a high level output signals are supplied from the output ports B3 and B4, respectively.

In the above described arrangement of the control circuit C'' for the drive controlling mechanism K'', when the power source is turned on (initial state), a high level output signal is supplied from the reset circuit 73 for approximately 100 msec. as described above. When the high level output signal from the reset circuit 73 is applied to the input port RST, low level output signals are supplied from the output ports B3, and B4, respectively. Since the high level output signal from the OR circuit 73 is applied to the input terminal 74" of the OR circuit 74, a high level output signal from the output terminal 74'" of the OR circuit 74 is applied to the input terminal CL of the flip-flop 70a and thus, a high level output signal is supplied from the output terminal $\overline{Q}$ of the flip-flop 70a regardless of whether the microswitch SW3 is in the ON state or the OFF state. However, since the low level output signal from the output port B3 is applied to the input terminal 72' of the AND circuit 72, a low level output signal is at all times supplied from the output terminal 72'" of the AND circuit 72 to the input terminal 43a" of the AND circuit even if a high level signal is applied to the input terminal 72" of the AND circuit 72 upon turning on of the microswitch SW3, so that a high level output signal is never supplied from the AND circuit 43a.

Meanwhile, the low level output signal from the output port B3 and the high level output signal from the reset circuit 73 are applied to the input terminals CL' and PR' of the flip-flop 70b, respectively, a low level output signal corresponding to the low level input signal applied to the input terminal CL' is supplied from the output terminal $\overline{Q}'$ of the flip-flop 70b to the input terminal 43b' of the AND circuit 43b. Since the above described state remains unchanged even if a high level signal is applied to the input terminal CP' of the flip-flop 70b upon turning on of the microswitch SW4, a high level output signal is never supplied from the AND circuit 43b. Namely, low level output signals are supplied from the AND circuits 43a and 43b, respectively regardless of whether each of the microswitches SW3 and SW4 is in the ON state or the OFF state and thus, the drive motor 21 is maintained at a stop.

When the reset circuit 73 is reset upon lapse of approximately 100 msec. after turning on of the power source, a low level output signal is supplied from the reset circuit 73 to the input port RST, so that a high level and a low level output signals are supplied from the output ports B3 and B4, respectively. Since each of the input terminals 74' and 74" of the OR circuit 74 receives a low level input signal, a low level output signal is supplied from the OR circuit 74 to the input terminal 43b" of the AND circuit 43b and thus, a high level output signal is not supplied from the AND circuit 43b to the input terminal 45a' of the motor drive circuit 45; namely, the drive motor 21 is not rotated in the reverse direction. Meanwhile, the input terminal CL of the flip-flop 70a and the input terminal PR' of the flip-flop 70b receive the low level output signal from the OR circuit 74 and the low level signal from the reset circuit 73, respectively while the input terminal 72' of the AND circuit 72 receives the high level output signal from the output port B3.

Accordingly, when the lens unit 1 is held at a stop at the position corresponding to the life size copying mode with the microswitch SW3 having been in the ON state beforehand, the high level signal from the switch SW3 is inverted to a low level signal by the inverter 71, so that the low level signal is applied to the input terminal 72" of the AND circuit 72 and thus, a low level output signal from the AND circuit 72 is applied to the input terminal 43a" of the AND circuit 43a while a low level output signal corresponding to the low level input signal applied to the input terminal CL of the flip-flop 70a is supplied from the output terminal $\overline{Q}$ of the flip-flop 70a to the input terminal 43a' of the AND circuit 43a, whereby a low level output signal is at all times supplied from the AND circuit 43a to the input terminal 45a of the motor drive circuit 45. Since the low level output signal is supplied from the AND circuit 43b to the input terminal 45a' of the motor drive circuit 45 as described above, the drive motor 21 is not caused to rotate.

On the other hand, when the lens unit 1 is not disposed at the position corresponding to the life size copying mode with the microswitch SW3 being in the OFF state, a low level input signal is applied to the input terminal PR of the flip-flop 70a and a high level output signal from the output terminal $\overline{Q}$ of the flip-flop 70a is applied to the input terminal 43a' of the AND circuit 43a. Further, since a high level signal inverted by the inverter 71 and a high level output signal from the output port B3 are applied to the input terminals 72" and 72' of the AND circuit 72, respectively, a high level output signal is supplied from the output terminal 72'" of the AND circuit 72 to the input terminal 43a" of the AND circuit 43a and thus, a high level output signal is supplied from the output terminal 43a'" of the AND circuit 43a to the input terminal 45a of the motor drive circuit 45. Accordingly, since the drive motor 21 is rotated in the normal direction, the lens unit 1 is moved to the position corresponding to the life size copying mode as described above, so that the microswitch SW3 is turned on upon swing movement of the lever 24a. Namely, when the lens unit 1 is not disposed at the position corresponding to the life size copying mode, the lens unit 1 is returned to the position corresponding to the life size copying mode as an initial setting. Therefore, since a low level output signal is supplied from the output terminal $\overline{Q}$ of the flip-flop 70a to the input terminal 43a' of the AND circuit 43a during rise of an input signal applied to the input terminal CP in response to the ON signal of the microswitch SW3, through inversion of the level of an input signal applied to the input terminal D (This state is sustained until rise of a next input signal applied to the input terminal CP.), a low level output signal is supplied from the output terminal 43a'" of the AND circuit 43a to the input terminal 45a of the motor drive circuit 45 and thus, rotation of the drive motor 21 in the normal direction is stopped. Even if a bouncing phenomenon that the microswitch SW3 alternately repeats ON and OFF states takes place through stop of rotation of the drive motor 21 in the normal direction and thus, high level output signals are supplied from the AND circuit 72 in a pulse mode, the output signal from the output terminal $\overline{Q}$ of the flip-flop 70a is maintained at the low level, so that a high level output signal is not supplied from the AND circuit 43a to the input terminal 45a of the motor drive circuit 45 and thus, the drive motor 21 is not caused to rotate again.

Subsequently, when the reduced size copying mode is selected through turning on of the switch SW2, a low level and a high level output signals are, respectively, supplied from the output ports B3 and B4, so that a high level output signal is supplied from the output terminal 74"40 of the OR circuit 74 to the input terminal CL of the flip-flop 70a, the input terminal D' of the flip-flop 70b and the input terminal 43b" of the AND circuit 43b. Since the low level output signal from the output port B3 is applied to the input terminal D of the flip-flop 70a and the input terminal 72' of the AND circuit 72, a low level output signal is supplied from the output terminal 72''' of the AND circuit 72 to the input terminal 43a'' of the AND circuit 43a, so that a high level output signal is not supplied from the AND circuit 43a and thus, the drive motor 21 is not caused to rotate in the normal direction. Meanwhile, since low level input signals are, respectively, applied to the input terminals PR' and CL' of the flip-flop 70b, a high level output signal is supplied from the output terminal $\bar{Q}$ of the flip-flop 70b to the input terminal 43b' of the AND circuit 43b, so that a high level output signal is supplied from the output terminal 43b''40 of the AND circuit 43b, so that a high level output signal is supplied from the output terminal 43b''' of the AND circuit 43b to the input terminal 45a' of the motor drive circuit 45 and thus, the drive motor 21 is rotated in the reverse direction, whereby the lens unit 1 is moved to the position corresponding to the reduced size copying mode and then, the microswitch SW4 is turned on upon swing movement of the lever 24b. Since a low level output signal is supplied from the output terminal $\bar{Q}'$ of the flip-flop 70b to the input terminal 43b' of the AND circuit 43b during rise of an input signal applied to the input terminal CP' in response to the ON signal of the microswitch SW4, though inversion of the level of an input signal applied to the input terminal D' (This state is sustained until rise of a next input signal applied to the input terminal CP'.), a low level output signal is supplied from the output terminal 43b''' of the AND circuit 43b to the input terminal 45a' of the motor drive circuit 45 and thus, rotation of the drive motor 21 in the reverse direction is stopped. Even if a bouncing phenomenon that the microswitch SW4 alternately repeats ON and OFF state takes place through stop of rotation of the drive motor 21 in the reverse direction, the output signal from the output terminal $\bar{Q}'$ of the flip-flop 70b is maintained at the low level, so that a high level output signal is not supplied from the output terminal 43b''', of the AND circuit 43b to the input terminal 45a' of the motor drive circuit and thus, the drive motor 21 is not caused to rotate again.

Subsequently, when the life size copying mode is selected upon turning on of the switch SW1, a high level and a low level output signals are supplied from the output port B3 and B4, respectively, so that a low level output signal is supplied from the OR circuit 74 and thus, the high level output signal from the output port B3 is applied to the input terminal D of the flip-flop 70a, the input terminal CL' of the flip-flop 70b and the input terminal 72' of the AND circuit 72 while the low level output signal from the OR circuit 74 is applied to the input terminal 43b' of the AND circuit 43b, the input terminal CL of the flip-flop 70a and the input terminal D' of the flip-flop 70b. Meanwhile, since the microswitch SW3 is in the OFF state, a low level signal is applied to the inverter 71 so as to be inverted to a high level signal, so that the high level signal is applied to the input terminal 72'' of the AND circuit 72 and thus, a high level output signal is supplied from the output terminal 72''' of the AND circuit 72 to the input terminal 43a'' of the AND circuit 43a. Since the microswitch SW3 is in the OFF state at this moment, a low level signal is applied to the input terminal PR of the flip-flop 70a, so that a high level output signal is supplied from the output terminal $\bar{Q}$ of the flip-flop 70a to the input terminal 43a' of the AND circuit 43a. Since the input terminal 43a' also recieves the high level output signal from the AND circuit 72 as described above, a high level output signal is supplied from the AND circuit 43a to the input terminal 45a of the motor drive circuit 45. Meanwhile, since the low level output signal from the OR circuit 74 is applied to the input terminal 43b'' of the AND circuit 43b, a high level output signal is not supplied from the AND circuit 43b. Accordingly, the drive motor 21 is rotated in the normal direction, so that the lens unit 1 is moved to the position corresponding to the life size copying mode and thus, the microswitch SW3 is turned on. As described above, since a low level output signal is supplied from the output terminal $\bar{Q}$ of the flip-flop 70a to the input terminal 43a' of the AND circuit 43a during rise of an input signal applied to the input terminal CP of the flip-flop 70a in response to the ON signal of the microswitch SW3, through inversion of the level of an input signal applied to the input terminal D, a low level output signal is supplied from the AND circuit 43a to the input terminal 45a of the motor drive circuit 45 and thus, rotation of the drive motor 21 in the normal direction is stopped. Furthermore, even if the bouncing phenomenon of the microswitch SW3 takes place and thus, high level output signals are supplied from the AND circuit 72 in a pulse mode, the output signal from the output terminal $\bar{Q}$ of the flip-flop 70a is maintained at the low level, so that a high level output signal is not supplied from the AND circuit 43a to the input terminal 45a of the motor drive circuit 45 and thus, the drive motor 21 is not caused to rotate again.

On the other hand, in the case where the lens unit 1 is being moved along the linear path, high level output signals are, respectively, supplied from the output terminal $\bar{Q}$ of the flip-flop 70a and the output terminal $\bar{Q}'$ of the flip-flop 70b to the input ports A3 and A4 of the microswitch MC'' and thus, the copying apparatus is set to a wait state by a program of the microcomputer MC''.

Although the drive controlling mechanism K'' according to the third embodiment of the present invention has been described in connection with the copying apparatus having two copying magnification modes, the drive controlling mechanism K''' of optical members for use in a copying apparatus having three copying magnification modes, according to the fourth embodiment of the present invention will be described with reference to FIGS. 1 to 5 and FIG. 11, hereinbelow. Since the mechanical arrangements of the drive controlling mechanism K''' are the same as those of the drive controlling mechanism K', detailed description thereof is abbreviated for brevity.

Referring back to FIG. 11, there is shown the control circuit C''' for the drive controlling mechanism K'''. It is to be noted that control circuit C''' further includes portions shown in broken lines in addition to the arrangements of the control circuit C'' shown in solid lines. Namely, the control circuit C''' further includes a switch SW5 for selecting the third copying magnification mode, a lamp L3 for displaying the third copying magnification mode, inverters 80 and 81, and a solenoid 82 for the third copying magnification mode in addition to the arrangements of the control circuit C''. The microcomputer MC'' is further provided with an input port A5 and output ports B5 and B6. The switch SW5 is connected to the input port A5. The output port B5 is connected to the lamp L3 through the inverter 80. The output port B6 is connected to the solenoid 82 via the inverter 81. Since operation of the control circuit C''' is similar to that of control circuit C'', detailed description thereof is abbreviated for brevity. Thus, the control circuit C'''' can be obtained only by adding the above described electrical components to the control circuit C'' without any modification of the control circuit C''.

Meanwhile, although negative magnifications, i.e. reductions have been described in each embodiment of the present invention, it should be noted that the present invention is applicable to positive magnifications in the same manner as described above. Furthermore, the drive controlling mechanism of the present invention is not limited, in its application, to the lens unit but can be applied to a mirror in the case of a copying apparatus in which the optical path length is also changed in response to change of copying magnifications.

In accordance with the present invention, only a single control arrangement for the optical member is required to be provided regardless of change in number of copying magnifications and detection of stop positions of the optical member can be effected by only two detecting members of detecting swing movement of a pair of pulleys and further, adjustment of the stop positions of the optical member can be made with much ease through independent adjustment of the stopper members and the detecting members for detecting swing movement of the pulleys.

Furthermore, in accordance with the present invention, the optical member is stopped at the predetermined positions selected by the selective signal generating means, by a plurality of the stopper members provided in the course of the linear path of reciprocating movement of the optical member while rotational drive of the drive pulley is stopped through selective detection of swing movement of the pulleys provided at opposite ends in the direction of reciprocating movement of the optical member by the detecting member for detecting swing movement of the pulleys and the drive pulley is prevented from being driven for rotation thereof until a next selective signal is generated, whereby the drive pulley is positively prevented from being driven for rotation thereof so that the optical member may be held at a stop.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A drive controlling mechanism of optical members for use in a copying apparatus, comprising:
    an optical member which is supported to be movable reciprocatingly along a linear path;
    a pair of a first and a second pulleys which are swingably provided at opposite ends in the direction of reciprocating movement of said optical member and on a plane in parallel with said linear path of movement of said optical member;
    a drive pulley for driving said first and said second pulleys for rotation thereof, which is provided between said first and said second pulleys and is arranged to be rotatable in a normal direction and the reverse direction;
    a wire which is wound around said pair of said first and said second pulleys and said drive pulley and is secured to said optical member;
    a plurality of stopper members for stopping said optical member at predetermined positions, which are provided in the course of said linear path of movement of said optical member;
    a pair of a first and a second urging members for urging said first and said second pulleys in opposite directions for preventing said optical member from being brought out of contact with said stopper member;
    a pair of a first and a second detecting members for detecting swing movement of said first and said second pulleys, respectively;
    said first and said second pulleys being selectively swung through contact of said optical member by one of said stopper members; and
    a control means including an electrical circuitry, which is arranged to stop rotational drive of said drive pulley through selective detection of swing movement of respective said first and said second pulleys by said first and said second detecting members.

2. A drive controlling mechanism as claimed in claim 1, wherein said control means includes a microcomputer and a motor drive circuit leading to a drive motor for driving said drive pulley for rotation thereof with said microcomputer being connected to said motor drive circuit,
    said first and said second detecting members being connected to said microcomputer and said motor drive circuit.

3. A drive controlling mechanism as claimed in claim 2, wherein said stopper members are disposed at the opposite ends of linear path of movement of said optical member and at the intermediate position therebetween, and the intermediate stopper member is retractable from the linear path of movement of said optical member.

4. A drive controlling mechanism of optical members for use in a copying apparatus, comprising:
    an optical member which is supported to be movable reciprocatingly along a linear path;
    a pair of a first and a second pulleys which are swingably provided at opposite ends in the direction of reciprocating movement of said optical member and on a plane in parallel with said linear path of movement of said optical member;
    a drive pulley for driving said first and said second pulleys for rotation thereof, which is provided between said first and said second pulleys and is arranged to be rotatable in a normal direction and the reverse direction;
    a wire which is wound around said pair of said first and said second pulleys and said drive pulley and is secured to said optical member;
    a plurality of stopper members for stopping said optical member at predetermined positions, which are provided in the course of said linear path of movement of said optical member;
    a pair of a first and a second urging members for urging said first and said second pulleys, respectively in opposite directions for preventing said optical member from being brought out of contact with said stopper member;
    a pair of a first and a second detecting members for detecting swing movement of said first and said second pulleys, respectively;
    said first and said second pulleys being selectively swung through contact of said optical member by one of said stopper members;

a selective signal generating means which generates a selective signal for selecting one of the predetermined positions of said optical member; and a control means including an electrical circuitry, which is arranged to drive said drive pulley for rotation thereof so as to move said optical member to the one of the predetermined positions selected by said selective signal of said selective signal generating means, to stop rotational drive of said drive pulley through selective detection of swing movement of respective said first and said second pulleys by said first and said second detecting members, and to prevent said drive pulley from being driven for rotation thereof until a next selective signal is generated.

5. A drive controlling mechanism as claimed in claim 4, wherein said control means includes a microcomputer, a reset circuit, a first flip-flop connected to said first detecting member, a second flip-flop connected to said second detecting member, and a motor drive circuit leading to a drive motor for driving said drive pulley for rotation thereof with said microcomputer being connected to said motor drive circuit, said first and said second flip-flops being connected to said microcomputer, said reset circuit being connected to said microcomputer and said second flip-flop.

6. A drive controlling mechanism as claimed in claim 5, wherein said control means further includes a solenoid connected to said microcomputer.

7. A drive controlling mechanism as claimed in claim 1 or claim 4, wherein said optical member is a lens unit.

8. A drive controlling mechanism as claimed in claim 1 or claim 4, wherein said optical member is a mirror.

9. A drive controlling mechanism as claimed in claim 1 or claim 4, each of said first and said second urging members is a leaf spring.

10. A drive controlling mechanism as claimed in claim 1 or claim 4, said first and said second detecting members are a first and a second microswitches, respectively.

11. A drive controlling mechanism as claimed in claim 10, further including a pair of a first lever formed with a first protrusion and a second lever formed with a second protrusion, and a pair of a first and a second leaf springs with said first and said second levers being pivotally provided, said first and said second pulleys being, respectively, rotatably mounted on said first and said second levers with said first and said second leaf springs being, respectively, disposed between said first portrusion and said first microswitch and between said second protrusion and said second microswitch, said first and said second protrusions being, respectively, brought into contact with said first and said second leaf springs upon pivotal movement of said first and said second levers so as to bias said first and second leaf springs into contact with said first and said second microswitches so that said first and second microswitches may be turned on.

* * * * *